(12) United States Patent
Galal et al.

(10) Patent No.: US 11,206,844 B2
(45) Date of Patent: Dec. 28, 2021

(54) DRY BLEND FOR MAKING EXTENDED CHEESE PRODUCT

(71) Applicant: Allied Blending & Ingredients Inc., St. Louis, MO (US)

(72) Inventors: Mostafa Galal, Rogersville, MO (US); John Fannon, St. Louis, MO (US)

(73) Assignee: ALLIED BLENDING & INGREDIENTS INC., St. Louis, MO (US)

( * ) Notice: Subject to any disclaimer, the term of this patent is extended or adjusted under 35 U.S.C. 154(b) by 0 days.

(21) Appl. No.: 13/671,773

(22) Filed: Nov. 8, 2012

(65) Prior Publication Data

US 2013/0122177 A1    May 16, 2013

Related U.S. Application Data

(60) Provisional application No. 61/558,188, filed on Nov. 10, 2011.

(51) Int. Cl.
*A23C 19/082* (2006.01)
*A23C 20/00* (2006.01)

(52) U.S. Cl.
CPC ............ *A23C 19/082* (2013.01); *A23C 20/00* (2013.01)

(58) Field of Classification Search
CPC .................................. A23C 20/00; A23C 19/082
See application file for complete search history.

(56) References Cited

U.S. PATENT DOCUMENTS

| | | | |
|---|---|---|---|
| 4,499,116 A * | 2/1985 | Zwiercan et al. | 426/582 |
| 4,937,091 A | 6/1990 | Zallie | |
| 5,244,687 A | 9/1993 | Rybinski et al. | |
| 5,277,926 A | 1/1994 | Batz et al. | |
| 5,807,601 A * | 9/1998 | Carpenter | A23C 20/00 |
| | | | 426/578 |
| 5,935,634 A | 8/1999 | Gamay | |
| 6,120,809 A | 9/2000 | Rhodes | |
| 6,319,526 B1 * | 11/2001 | Dahlstrom et al. | 426/36 |
| 6,998,145 B2 | 2/2006 | Henry et al. | |
| 7,291,356 B2 * | 11/2007 | Merrill et al. | 426/582 |
| 7,651,715 B2 * | 1/2010 | Merrill et al. | 426/582 |
| 7,807,207 B2 | 10/2010 | Huang | |
| 7,976,886 B2 | 7/2011 | Merrill et al. | |
| 10,531,673 B2 | 1/2020 | Atapattu | |
| 10,785,990 B2 | 9/2020 | Galal | |

(Continued)

FOREIGN PATENT DOCUMENTS

| CA | 2161713 A1 | 5/1996 |
|---|---|---|
| CA | 2161713 C | 1/2007 |

(Continued)

OTHER PUBLICATIONS

Fox et al. Cheese Chemistry, Physics and Microbiology 3rd edition , Elsevier (2004), p. 365 (Year: 2004).*

(Continued)

*Primary Examiner* — Subbalakshmi Prakash
(74) *Attorney, Agent, or Firm* — Dennis A. Bennett; C A Schlect (57) ABSTRACT

Disclosed herein are extended cheese products, pre-filled cheese extender packages having dry blends used in the process of making extended cheese products, as well as methods of making extended cheese products.

8 Claims, 1 Drawing Sheet

(56) References Cited

U.S. PATENT DOCUMENTS

| | | | |
|---|---|---|---|
| 2003/0008056 A1 | 1/2003 | Henry | |
| 2003/0228393 A1 | 12/2003 | Zhao | |
| 2005/0220976 A1 | 10/2005 | Mussawir-Key | |
| 2005/0271789 A1 | 12/2005 | Merrill | |
| 2006/0062885 A1* | 3/2006 | Jacobson et al. | 426/582 |
| 2006/0134297 A1* | 6/2006 | Bell | 426/582 |
| 2009/0061065 A1* | 3/2009 | Reyes | 426/582 |
| 2011/0229622 A1 | 9/2011 | Merrill et al. | |
| 2013/0122177 A1 | 5/2013 | Fannon | |
| 2013/0243926 A1* | 9/2013 | Atapattu et al. | 426/582 |
| 2013/0295265 A1 | 11/2013 | Fannon et al. | |
| 2014/0154388 A1 | 6/2014 | Fannon et al. | |
| 2018/0249728 A1 | 9/2018 | Galal | |
| 2020/0100517 A1 | 4/2020 | Atapattu | |
| 2020/0375208 A1 | 12/2020 | Galal | |

FOREIGN PATENT DOCUMENTS

| | | | |
|---|---|---|---|
| EP | 635215 A1 | 1/1995 | |
| EP | 2030507 A2 | 3/2009 | |
| KR | 20070063473 A | 6/2007 | |
| WO | 9625051 A1 | 8/1996 | |
| WO | 9926482 A1 | 6/1999 | |
| WO | 2001049123 A1 | 7/2001 | |
| WO | 200505107486 A2 | 11/2005 | |
| WO | 200505107486 A3 | 11/2005 | |
| WO | WO 2005107486 A2 * | 11/2005 | |
| WO | 2008054232 A1 | 5/2008 | |
| WO | 2010091834 A1 | 8/2010 | |
| WO | 2013070874 | 5/2013 | |
| WO | 2013070874 A1 | 5/2013 | |
| WO | 2013070874 A3 | 5/2013 | |
| WO | 2013138728 A1 | 9/2013 | |
| WO | 2013138728 A3 | 9/2013 | |
| WO | 2013138728 A3 | 9/2013 | |
| WO | 2013165956 A1 | 11/2013 | |
| WO | 2013165956 A3 | 11/2013 | |
| WO | 2014085250 A3 | 3/2014 | |
| WO | 2014085250 A1 | 6/2014 | |
| WO | 2014085250 A3 | 6/2014 | |
| WO | 2015061679 A1 | 4/2015 | |

OTHER PUBLICATIONS

Chavan, Rupesh S.et al., Cheese Substitutes: An Alternative to Natural Cheese—A Review, International Journal of Food Science, Technology & Nutrition, 2007, vol. 2., pp. 25-39.
European Search Report, EP Application No. 12848223.9, dated Jun. 16, 2015, 6 pgs.
Anonymous, Apr. 2010, Instant Three Cheese Sauce, Database GNPD, Mintel, Database accession No. 1303078, URL:www.gnpd.com, XP002757861 [X] 1,4-8.
Anonymous, Grated Italian Cheese Blend, Database GNPD, Mintel, Database accession No. 507363, URL:www.gnpd.com, XP002757862 [X] 12-17.
Atapattu, C et al.,Dry Blend for Making Analogue Cheese, Allied Blending & Ingredients Inc., US 20130243926 A1, Non-final rejection, dated Aug. 28, 2014.
Atapattu, C et al.,Dry Blend for Making Analogue Cheese, Allied Blending & Ingredients Inc., US 20130243926 A1, Non-final rejection, dated Feb. 23, 2016.
Fannon J. et al., Dry Blend for Making Extended Cheese Product, Allied Blending & Ingredients Inc., US20130295265A1, Non-final rejection, dated Dec. 5, 2013.
Fannon J. et al., Dry Blend for Making Extended Cheese Product, Allied Blending & Ingredients Inc., US20130295265A1, Non-final rejection, dated Sep. 10, 2014.
Fannon J. et al., Dry Blend for Making Extended Cheese Product, Allied Blending & Ingredients Inc., US20130295265A1, Non-final rejection, dated May 7, 2015.
Fannon J. et al., Dry Blend for Making Extended Cheese Product, Allied Blending & Ingredients Inc., US20130295265A1, Final rejection, dated Feb. 25, 2016.
Fannon J et al., Dry Blend for Making Cheese Analogue, Allied Blending & Ingredients Inc., US20140154388A1, Non-final rejection, dated Jun. 11, 2015.
Fannon J et al., Dry Blend for Making Cheese Analogue, Allied Blending & Ingredients Inc., US20140154388A1, Final rejection, dated Mar. 28, 2016.
Fannon J et al., Improved Dry Blend for Making Extended Cheese Product, Allied Blending & Ingredients Inc., WO2013070874A1—International Preliminary Report on Patentability Chapter I, dated May 13, 2014.
Fannon J et al., Improved Dry Blend for Making Analogue Cheese, Allied Blending & Ingredients Inc., WO2013138728A1—International Preliminary Report on Patentability Chapter I, dated Sep. 16, 2014.
Fannon J et al., Improved Dry Blend for Making Extended Cheese Product, Allied Blending & Ingredients Inc., WO2013165956A1—International Preliminary Report on Patentability Chapter I, dated Nov. 4, 2014.
Fannon J et al., Improved Dry Blend for Making Cheese Analogue, WO2014085250A1—International Preliminary Report on Patentability Chapter I, dated Jun. 2, 2015.
European Search Report, EP Application No. 13760286.8, dated Oct. 14, 2015, 5 pgs.
Extended European Search Report, EP Application No. 13784139.1, dated Aug. 31, 2015, 6 pages.
Fannon J et al., Dry Blend for Making Extended Cheese Product, Allied Blending & Ingredients Inc, US20130122177A1, Non-final rejection, dated Jan. 11, 2016.
Fannon J et al., Dry Blend for Making Extended Cheese Product, Allied Blending & Ingredients Inc, US20130122177A1, Non-final rejection, dated Apr. 10, 2015.
Fannon J et al., Dry Blend for Making Extended Cheese Product, Allied Blending & Ingredients Inc, US20130122177A1, Non-final rejection, dated Jul. 31, 2014.
Fannon J et al., Dry Blend for Making Extended Cheese Product, Allied Blending & Ingredients Inc, US20130122177A1, Non-final rejection, dated Sep. 27, 2013.
Bachman, H., "Cheese Analogues: A Review", Int Diary J., 11:505-515, (2001).
Declaration of John Fannon, Ph.D Under 37 C.F.R. §1.132, date of signature Mar. 27, 2018; 08 pages.
International Application No. PCT/US2012/064091; International Search Report and Written Opinion of the International Searching Authority, dated Mar. 15, 2013; 16 pages.
International Application No. PCT/US2013/032119; International Search Report and Written Opinion of International Searching Authority, dated Jun. 26, 2013; 12 pages.
International Application No. PCT/US2013/038777; International Search Report and Written Opinion of the International Searching Authority, dated Sep. 25, 2013; 11 pages.
International Application No. PCT/US2013/071475; International Search Report and Written Opinion of International Searching Authority, dated Mar. 24, 2014; 08 pages.
International Application No. PCT/US2014/062169; International Preliminary Report on Patentability, dated Apr. 26, 2016; 07 pages.
International Application No. PCT/US2014/062169; International Search Report and Written Opinion of International Searching Authority, dated Feb. 9, 2015; 08 pages.
Mounsey, J. et al., "Alteration of Imitation Cheese Structure and Melting Behaviour with Wheat Starch", Eur Food Res Tech., 226(5):1013-9, (2008).
Solowiej, B. et al., "The Effect of pH and Modified Maize Starches on Texture, Rheological Properties and Meltability of Acid Casein Processed Cheese Analogues", Eur Food Res Technol., 242(9):1577-85, (2016).
U.S. Appl. No. 13/835,846; Applicant Initiated Interview Summary dated May 3, 2018; 04 pages.
U.S. Appl. No. 13/835,846; Applicant-Initiated Interview Summary, dated Dec. 3, 2018; 4 pages.
U.S. Appl. No. 13/835,846; Final Office Action dated Apr. 12, 2018; 13 pages.
U.S. Appl. No. 13/835,846; Final Office Action dated May 6, 2015; 14 pages.

(56) References Cited

OTHER PUBLICATIONS

U.S. Appl. No. 13/835,846; Final Office Action dated Sep. 19, 2016; 15 pages.
U.S. Appl. No. 13/835,846; Final Office Action, dated Feb. 26, 2019; 20 pages.
U.S. Appl. No. 13/835,846; Non-Final Office Action dated Sep. 6, 2017; 11 pages.
U.S. Appl. No. 13/835,846; Non-Final Office Action, dated Nov. 13, 2018; 35 pages.
U.S. Appl. No. 13/873,607; Final Office Action dated Aug. 9, 2017; 15 pages.
U.S. Appl. No. 13/873,607; Non-Final Office Action dated Oct. 27, 2016; 15 pages.
U.S. Appl. No. 14/087,676; Applicant Initiated Interview Summary dated Jul. 30, 2018; 3 pages.
U.S. Appl. No. 14/087,676; Final Office Action dated Jan. 30, 2019; 27 pages.
U.S. Appl. No. 14/087,676; Final Office Action dated Sep. 22, 2017; 13 pages.
U.S. Appl. No. 14/087,676; Non-Final Office Action dated Jun. 20, 2016; 23 pages.
U.S. Appl. No. 14/087,676; Non-Final Office Action dated Oct. 14, 2016; 13 pages.
U.S. Appl. No. 15/893,064; Applicant-Initiated Interview Summary, dated Apr. 25, 2019; 3 pages.
U.S. Appl. No. 15/893,064; Final Office Action, dated Apr. 4, 2019; 23 pages.
U.S. Appl. No. 15/893,064; Non-Final Office Action dated Jul. 12, 2018; 31 pages.
U.S. Appl. No. 15/893,064; Non-Final Office Action, dated Nov. 30, 2018; 23 pages.
U.S. Appl. No. 13/835,846; Notice of Allowance, dated Sep. 9, 2019; 18 pages.
U.S. Appl. No. 14/087,676; Non-Final Office Action, dated Sep. 11, 2019; 23 pages.
U.S. Appl. No. 15/893,064; Applicant-Initiated Interview Summary, dated Aug. 6, 2019; 3 pages.
U.S. Appl. No. 15/893,064; Non-Final Office Action, dated Sep. 19, 2019; 17 pages.
U.S. Appl. No. 14/087,676; Applicant-Initiated Interview Summary, dated Oct. 9, 2019; 3 pages.
U.S. Appl. No. 16/705,015; Application as filed; filed Dec. 6, 2019; 23 pages.
U.S. Appl. No. 15/893,064; Examiner-Initiated Interview Summary, dated Jan. 3, 2020; 2 pages.
U.S. Appl. No. 15/893,064; Final Office Action, dated Jan. 3, 2020; 20 pages.
Fox, P. et al., "Cheese: Chemistry, Physics and Microbiology", 3rd Ed., vol. 2, 70 pages, (2004).
U.S. Appl. No. 14/087,676; Final Office Action, dated Jun. 29, 2020; 23 pages.
U.S. Appl. No. 14/087,676; Notice of Appeal filed, dated Oct. 29, 2020; 2 pages.
U.S. Appl. No. 16/705,015; Non-Final Office Action, dated Jan. 1, 2021; 24 pages.
U.S. Appl. No. 16/999,380; Non-Final Office Action, dated Nov. 19, 2020; 18 pages.

* cited by examiner

DRY BLEND FOR MAKING EXTENDED CHEESE PRODUCT

This application claims the benefit of priority of U.S. provisional application No. 61/558,188, filed Nov. 10, 2011, the disclosure of which is hereby incorporated by reference as if written herein in its entirety.

In recent years there has been a significant increase in demand for cheese generally, as well as for cheeses with specific performance or nutritional characteristics. This general demand is driven in part by the steady growth in the ready meal or convenience food sector of the food industry since cheese is an ingredient in many foods within this sector. Consumer's health concerns have been a major factor driving the increased demand for cheeses with improved nutritional characteristics, such as those that are lower in fat, differ in fatty acid profile, have increased calcium content, and/or are lower in cholesterol. These concerns, as well as cost considerations, have been the impetus for the development of a number of cheese analogues (e.g., imitation cheeses or cheese replaces) that offer various health advantages (e.g., replacement of animal fat with healthier vegetable oil and increased vitamin or mineral levels) and cost benefits (e.g., vegetable oils are less expensive than certain dairy ingredients).

The increasing popularity of various pizza-type products is one specific example of cheese-containing products in this sector that have contributed to the surge in demand. Pizzas illustrate this point well because of the variety found within pizza types, such as thickness of crust or whether the crust has been cooked before cheese is added and the pizza is baked. Each of these variables potentially impacts the composition of the cheese required to provide satisfactory performance.

Demand for cheese with varying performance characteristics is also driven in part by the significant increase in the different types of baking equipment and conditions that are being used to prepare food products containing cheese. Some baking operations, for instance, require relatively high oven temperatures (e.g., in the range of about 350 to 950° F.) with short baking times (e.g., in the range of about 30 seconds to 15 minutes). Such conditions may be used, for instance, in an impingement oven when baking a pizza having a thin crust. Other ovens, such as deck ovens, in contrast, sometimes use a relatively long bake time (e.g., about 6 to 60 minutes) and a correspondingly lower oven temperature (e.g., about 300 to 750° F.). Instead of baking, some foods topped with or including cheese are prepared by microwaving (e.g., about 1-6 minutes).

There are a variety of challenges to providing cheeses that have a composition which satisfies the desired performance characteristics and nutritional qualities. For instance, it can be difficult to obtain the desired concentration level of some ingredients in a cheese. Another problem is developing a process that activates the latent functional properties of certain ingredients. Another problem is that many methods for preparing cheese involve the loss of significant quantities of some cheese components during processing. This can occur, for instance, when such cheeses undergo the heating and stretching process of the pasta filata process. Often the heating is conducted in heated water, which can remove significant amounts of cheese ingredients.

In view of the high demand for cheese and the foregoing shortcomings associated with some existing methods for preparing such cheeses with the desired performance characteristics, there thus remains a need for additional methods for preparing cheeses of these types.

As alluded to above, there has been an increased demand for extended cheese products because of cost and health considerations. Extended cheese products generally refers to a cheese in which a filler has been added to extend the mass and volume of the cheese while maintaining the physical properties of the natural cheese. Extended cheese products are typically lower cost than other cheese types because the extending can be performed less expensively and because certain milk ingredients can be extended with cheaper products (e.g., extending milk fat with vegetable oil or milk protein with starch). The health benefits derive from extension of the milk fat and protein with other healthier ingredients and the ability to add other ingredients that can lower the cost of the final product.

However, replacing a conventional cheese composition ingredient can present one or more technical hurdles because cheese compositions are complex compositions and their properties can be sensitive to (i.e., require) the presence and/or amount of certain ingredients. Thus, conventional cheese manufacturing has come to rely on certain cheese composition ingredients to provide certain properties. Exemplary technical challenges include finding a replace ingredient that can provide a cheese composition with one or more suitable functional properties (e.g., melt, stretch, and firmness), organoleptic properties (e.g., texture and flavor), and nutritional properties.

Casein is one of the major components of cheese and typical extended cheese products. This family of related phosphoproteins is commonly found in mammalian milk, making up 80% of the proteins in cow's milk. Over the last few years casein has dramatically increased in price. Accordingly, there is an ongoing need in the cheese industry for an extender for casein in the manufacture of extended cheese products. One such extender is whey. Whey can be used to reduce or eliminate the need for the use of casein in making extended cheese products.

Starch can also be used as an extender for milk protein, milk fat, and cheese in extended cheese products. However, the ability to extend casein protein with starch can be significantly limited depending on the desired functional, organoleptic, and/or nutritional properties of the cheese composition. For example, extending casein with starch can provide a cheese composition with less than desired functional properties (e.g., melt, stretch, and firmness) because starch is not necessarily always a "functional" replacement of casein protein, but can merely replace a certain mass of casein protein. Similarly, starch can impart a different, sometimes less desirable, flavor and/or texture to the cheese composition than provided by casein. Furthermore, replacing casein protein with starch, a carbohydrate, can significantly alter the nutritional characteristics of a cheese composition (e.g., the cheese composition may not satisfy nutritional standards imposed by the United States Department of Agriculture). Thus, conventional cheese making has come to rely on the mere presence and sometimes quantity of casein protein to provide certain cheese composition properties.

Despite these limitations, there exists a strong desire (e.g., economic incentives) to further reduce the amount of casein protein in certain cheese compositions. However, providing suitable functional, organoleptic, and nutritional characteristics while reducing the casein protein even further in certain cheese compositions presents significant technical challenges.

Another ingredient that is commonly found in cheese analogues is shortening, which often contains trans-fat. In general, recent consumer trends indicate that trans-fatty acids (i.e., "trans-fat") in food products and food intermediates are being avoided by consumers to help increase the healthfulness of their diet. Accordingly, many food product marketers are finding ways to provide consumers with food products having reduced and/or substantially no trans-fat content.

Trans-fat is an unsaturated fatty acid in which the hydrogen atoms of a double bond (or unsaturation) are on opposite sides of the molecule. The trans isomer of the fatty acid causes the carbon chain to assume a straight-chain configuration similar to that of a saturated fat. Trans-fatty acids are primarily formed through the metal-catalyzed process of hydrogenation; however they have also been found to form naturally and are found at low levels in cow's milk. By hydrogenating oils through industrial processing, hydrogen atoms are added to unsaturated sites on fatty acids, creating a larger population of saturated fats in the oil. In a partially-hydrogenated oil, some of the unsaturated fatty acids remain. However, the processing causes some of the double-bonds of the unsaturated fatty acids to undergo isomerization from the cis configuration to the trans configuration.

Partial hydrogenation of fats was introduced into the U.S. food supply beginning in 1910. The practice was put into widespread use in the 1940's in order to make semisolid fat products. The process of hydrogenation raises the melting point of a fat and increases the solid fat content. Such fats having higher melting points and solid fat content help provide food compositions (e.g., cheese compositions) with highly desirable functional properties. For example, oils containing trans-fats can help an cheese analogue to have highly desirable properties (e.g., melt, crumble, stretch, firmness, combinations of these, and the like) at one or more temperatures (e.g., shred temperature, temperature of a consumer's mouth, combinations of these, and the like). In an additive, the stability of the fat is greatly enhanced through hydrogenation by reducing susceptibility to oxidation and subsequent rancidity. Therefore, positive contributions to processing properties, shelf-life, texture, and taste of food products (e.g., cheese compositions and food products incorporating such cheese compositions) are imparted by hydrogenated and partially hydrogenated fats.

A recent consumer trend is to avoid consuming food products that are high in, or have an undue amount of, trans-fat. To help meet consumer demand many food manufacturers would like to provide consumers with food products (e.g., extended cheese products and food products that include cheese (e.g., snack food (e.g., frozen snack food) including pizza, pizza-type snack food, and the like)) having a low amount of trans-fat (e.g., about 5% or less by weight of trans-fat based on the total weight of the fat component). However, changing the formulation of a food composition to accommodate this can present significant technical hurdles because of the reliance specifically on trans-fat containing ingredients to provide one or more highly desirable properties in food products and food product intermediates. Changing the trans-fat content of a food product can significantly impact properties such as processing properties, organoleptic properties, combinations of these, and the like, of the food product. As mentioned above, extended cheese products are complex chemical compositions; therefore their properties (e.g., melt, crumble, stretch, firmness, combinations of these, and the like) could be unduly affected by changes in formulation amounts and/or ingredient(s) that would affect trans-fat content. Accordingly, there is a strong need to provide extended cheese products having a low amount of trans-fat (e.g., about 5% or less by weight of trans-fat based on the total weight of the fat component) while at the same time substantially maintaining and/or improving extended cheese products properties such as melt, crumble, stretch, firmness, combinations of these, and the like. In addition, there is a strong need to provide food products including such extended cheese products and methods of making such extended cheese products and food products.

SUMMARY OF INVENTION

It has been discovered that a unique combination of ingredients provides an extended cheese product that has excellent flexibility with respect to formulation changes because the resulting extended cheese product can exhibit substantially the same or improved properties (e.g., functional/processing properties, organoleptic properties, combinations of these, and the like) over a range of significantly different cheese formulations, while allowing for the reduction of casein.

There is disclosed a dry blend useful in the manufacture of making extended cheese products. This dry blend is particularly useful for those who are making extended cheese products since the dry blend is easily used in the manufacture of extended cheese products by the addition of water, fat/oils, and cheese and/or cheese curds, and optionally the addition of flavoring to produce the desired product.

Further embodiments disclose:

A pre-filled cheese extender package having a dry blend comprising:
 a. 45%-65% modified food starch;
 b. 5%-18% whey;
 c. 10%-18% emulsifiers;
 d. 0%-8% gums; and
 e. 1%-5% acidulant,
wherein said dry blend is homogenously blended and filled into said pre-filled cheese extender package.

In an embodiment, said pre-filled cheese extender package has a dry blend comprising:
 a. 50%-60% modified food starch;
 b. 12%-16% whey;
 c. 10%-15% emulsifiers;
 d. 0%-8% gums; and
 e. 1%-3% acidulant.

In an embodiment, said pre-filled cheese extender package has a dry blend comprising:
 a. 53%-58% modified food starch;
 b. 13%-16% whey;
 c. 11%-14% emulsifiers;
 d. 0%-8% gums; and
 e. 1%-3% acidulant.

In an embodiment, said pre-filled cheese extender package has a dry blend comprising:
 a. 11%-13% Acetylated Potato Starch;
 b. 9%-11% Hydroxypropyl Phosphate Potato Starch;
 c. 5%-7% Starch Sodium Octenyl Succinate;
 d. 29%-31% Oxidized Acetylated Potato Starch;
 e. 13%-16% Dry Sweet Whey;
 f. 5%-8% Salt;
 g. 8%-11% Alkaline Sodium Aluminum Phosphate;
 h. 0%-2% Sodium Citrate;
 i. 0%-2% Disodium Phosphate—Duohydrate;
 j. 0%-2% Sorbic Acid;
 k. 0%-1% Mineral Oil;
 l. 3%-6% Blend of Xanthan, Locust, and Guar Gums; and
 m. 0%-3% Citric Acid.

In an embodiment, said acidulant is chosen from acetic acid, citric acid, fumaric acid, lactic acid, malic acid, phosphoric acid, and tartaric acid.

In an embodiment, said acidulant is chosen from citric acid, lactic acid, and acetic acid.

In an embodiment, said dry blend further comprises less than 10% casein.

In an embodiment, said dry blend is substantially free of casein.

In an embodiment, said dry blend further comprises a native food starch.

In an embodiment, said dry blend further comprises gelatin.

In an embodiment, said emulsifier is chosen from alkaline sodium aluminum phosphate, sodium citrate, trisodium phosphate, and disodium phosphate.

In an embodiment, at least half of said emulsifier is alkaline sodium aluminum phosphate.

In an embodiment, said dry blend contains less than 10% water.

In an embodiment, said dry blend contains less than 5% water.

In an embodiment, an extended cheese product is disclosed comprising:
 a. 3%-21% of a dry blend comprising:
  i. 45%-65% modified food starch;
  ii. 5%-18% whey;
  iii. 10%-18% emulsifiers;
  iv. 0%-8% gums; and
  v. 1%-5% acidulant;
 b. 3%-21% of a fat;
 c. 4%-28% water; and
 d. 30%-90% cheese and/or cheese curds, and
 wherein at least 90% of the casein found in said extended cheese product is derived from said cheese and/or cheese curds.

In an embodiment, an extended cheese product is disclosed comprising:
 a. 3%-21% of a dry blend comprising:
  i. 50%-60% modified food starch;
  ii. 12%-16% whey;
  iii. 10%-15% emulsifiers;
  iv. 0%-8% gums; and
  v. 1%-3% acidulant;
 b. 3%-21% of a fat;
 c. 4%-28% water; and
 d. 30%-90% cheese and/or cheese curds, and
 wherein at least 90% of the casein found in said extended cheese product is derived from said cheese and/or cheese curds.

In an embodiment, an extended cheese product is disclosed comprising:
 a. 3%-21% of a dry blend comprising:
  i. 53%-58% modified food starch;
  ii. 13%-16% whey;
  iii. 11%-14% emulsifiers;
  iv. 0%-8% gums; and
  v. 1%-3% acidulant;
 b. 3%-21% of a fat;
 c. 4%-28% water; and
 d. 30%-90% cheese and/or cheese curds, and
 wherein at least 90% of the casein found in said extended cheese product is derived from said cheese and/or cheese curds.

In an embodiment, an extended cheese product is disclosed comprising:
 a. 3%-21% of a dry blend comprising:
  i. 11%-13% Acetylated Potato Starch;
  ii. 9%-11% Hydroxypropyl Phosphate Potato Starch;
  iii. 5%-7% Starch Sodium Octenyl Succinate;
  iv. 29%-31% Oxidized Acetylated Potato Starch;
  v. 13%-16% Dry Sweet Whey;
  vi. 5%-8% Salt;
  vii. 8%-11% Alkaline Sodium Aluminum Phosphate;
  viii. 0%-2% Sodium Citrate;
  ix. 0%-2% Disodium Phosphate—Duohydrate;
  x. 0%-2% Sorbic Acid;
  xi. 0%-1% Mineral Oil;
  xii. 3%-6% Blend of Xanthan, Locust, and Guar Gums; and
  xiii. 0%-3% Citric Acid;
 b. 3%-21% of a fat;
 c. 4%-28% water; and
 d. 30%-90% cheese and/or cheese curds, and
 wherein at least 90% of the casein found in said extended cheese product is derived from said cheese and/or cheese curds.

In an embodiment, said cheese and/or cheese curds comprises 40%-60% of the cheese product.

In an embodiment, said cheese and/or cheese curds comprises 45%-55% of the cheese product.

In an embodiment, said extended cheese product is pizza cheese.

In an embodiment, a method of making an extended cheese product is disclosed, said method comprising:
 a. combining a melted fat, water, and a dry blend comprising:
  i. 45%-65% modified food starch;
  ii. 5%-18% whey;
  iii. 10%-18% emulsifiers;
  iv. 0%-8% gums; and
  v. 1%-5% acidulant;
 b. mixing the components;
 c. adding cheese and/or cheese curds;
 d. cooking the mixture to at least 150-155° F.;
 e. add additional water if needed;
 f. cooking the resulting mixture to 160-170° F.; and
 g. forming the extended cheese product and cooling it.

In an embodiment, optional replacement of cheese protein with native casein improves the stretchability of the finished product.

In an embodiment, a dry blend comprising:
 a. 45%-65% modified food starch;
 b. 5%-18% whey;
 c. 10%-18% emulsifiers;
 d. 0%-8% gums; and
 e. 1%-5% acidulant;
for use in making an extended cheese product is disclosed.

In an embodiment, the use of a dry blend comprising:
 a. 45%-65% modified food starch;
 b. 5%-18% whey;
 c. 10%-18% emulsifiers;
 d. 0%-8% gums; and
 e. 1%-5% acidulant;
for making an extended cheese product is disclosed.

DETAILED DESCRIPTION

Figure 1:
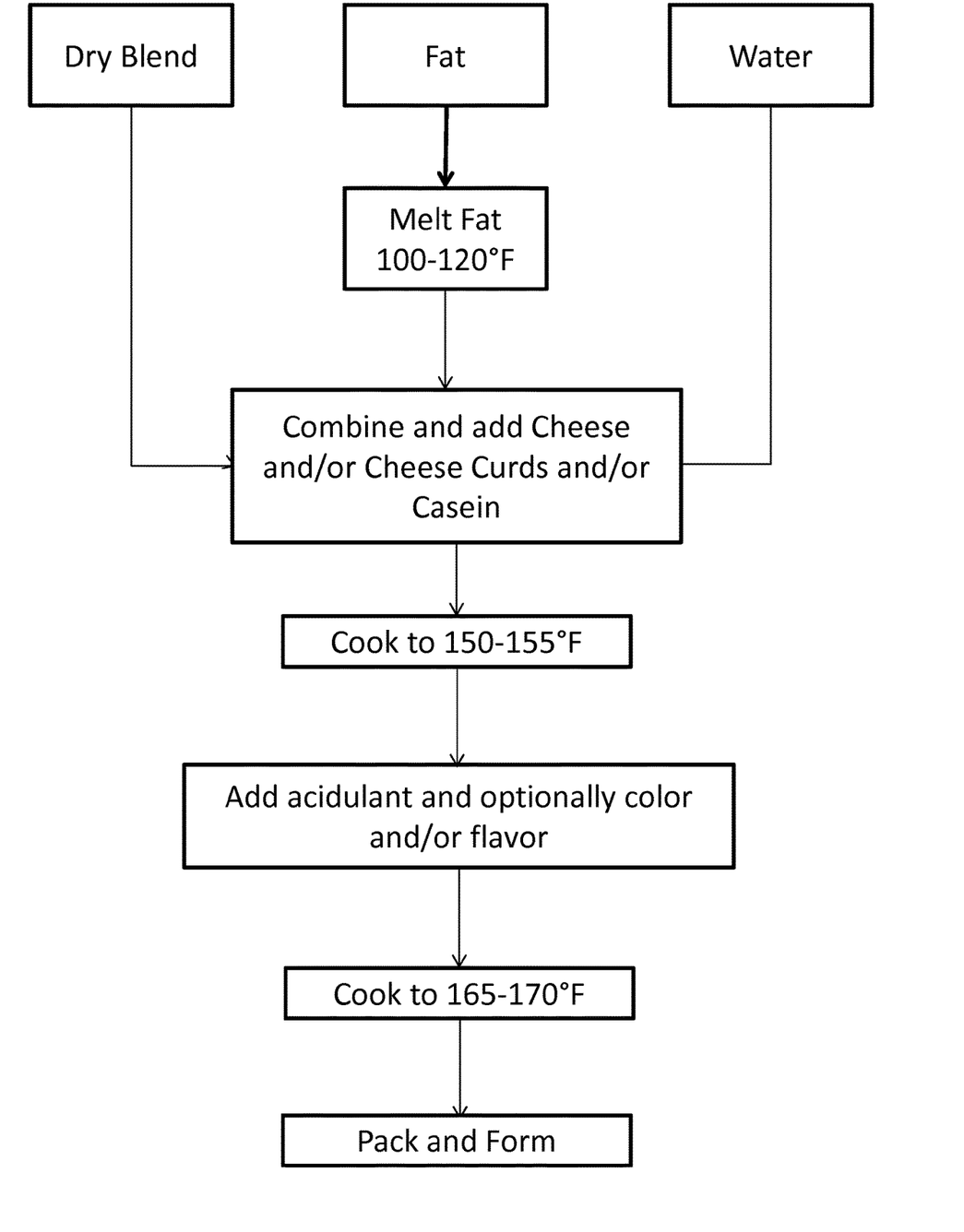
FIG. 1 depicts one example of a general method for making a cheese product using a dry blend.

A "cheese analogue" as used herein refers generally to a cheese in which at least one milk fat and/or protein source has been replaced with a source that is not native to milk. The basic ingredients for a cheese analogue are usually water, casein, a fat/oil and a sequestering agent. Cheese analogues are typically categorized as dairy (all fats and proteins come from dairy sources), partial dairy (some fats and proteins come from dairy sources, while other have been replaced with non-dairy fats and proteins), or nondairy (all fats and proteins come from non-dairy sources). They can also be classified as being an imitation cheese or a substitute cheese. Imitation cheese is a substitute for and resembles another cheese but is nutritionally inferior to that cheese. A cheese substitute, on the other hand, resembles another cheese but is not nutritionally inferior to that cheese.

An "extended cheese product" is a food product based on a natural cheese, but wherein filler material has been added to the natural cheese to extend the mass and volume while maintaining the physical properties of the natural cheese (i.e. meltability, stretchability, browning, elasticity, free oil formation, etc.).

A "pre-filled cheese extender package" is a package containing the dry blend that includes all the ingredients needed for a user to create an extended cheese product, such as, but not limited to, starches, gums, acidulants, whey, casein, emulsifiers, salts, and gelatin. These ingredients have been homogenously blended before being packaged.

Processed cheese has several technical advantages over unprocessed cheese, including extended shelf-life, resistance to separation when cooked, and uniformity of product. Its production also enjoys significant economic advantages over traditional cheese-making processes, most often through the ability to incorporate any of a wide variety of less expensive ingredients.

"Mozzarella" cheese has a minimum milk fat content of 45% by weight of the solids and a moisture content of more than 52% but not more than 60% by weight. "Low-moisture mozzarella" cheeses have a minimum milk fat content of 45% by weight of the solids and the moisture content is more than 45% but not more than 52% by weight. "Part-skim mozzarella" has a moisture content of more than 52% but not more than 60% by weight, and a milk fat content that is less than 45% but not less than 30% calculated on the solids basis. "Low-moisture part-skim" mozzarella has a moisture content of more than 45% but not more than 52% by weight and a milk fat content, calculated on the solids basis, of less than 45% but not less than 30%. Further details regarding these various mozzarella cheeses is provided by 21 C.F.R. § 1.33.155-133.158.

Pizza cheese is an extended cheese product designed to melt well on pizza while remaining chewy. It is sometimes used on commercially produced pizzas where some people may mistake it for the more traditional Mozzarella. Pizza cheese is formulated so that it can be made with basic cheese making equipment but without the additional equipment and processing that true Mozzarella requires. It has a soft texture, and is designed to melt well. Once melted, it typically has a slightly 'stringy' quality when pulled or bitten into.

Emulsifiers are used to provide a uniform structure during the melting process. The essential role of the emulsifying agents in the manufacturing of processed cheese is to supplement the emulsifying capability of cheese proteins. This is accomplished by removing calcium from the proteins; peptizing, solubilizing and dispersion of the proteins; hydrating and swelling of the proteins; emulsifying of fat and stabilizing of the emulsion and by forming an appropriate structure after cooling. The use of emulsifiers in processed cheese results in cheese that melts smoothly when cooked. With prolonged heating, unprocessed cheese will separate into a molten protein gel and liquid fat; processed cheese will not separate in this manner. The emulsifiers, typically alkaline sodium aluminum phosphate, disodium phosphate duohydrate and sodium citrate, or other sodium or potassium phosphate, tartrate, or citrate salts, reduce the tendency for tiny fat globules in the cheese to coalesce and pool on the surface of the molten cheese.

A number of different types of starches can be incorporated into the dry blend. Suitable starches include vegetable starches (e.g., potato starch, arrowroot starch, pea starch, and tapioca) and grain starches (e.g., corn starch, wheat starch, and rice starch). Specific examples of suitable corn starches include dent corn starch, waxy corn or maize starch, and high amylose corn starch. The starches can be used individually or in combination. As noted above, starches can advantageously be included in a slurry. In some applications, the starch is added as a powder or unheated solution.

The starch can be modified or native. Modified starches, also called starch derivatives, are prepared by physically, enzymatically, or chemically treating native starch, thereby changing the properties of the starch. Modified starches are used in practically all starch applications, such as in food products as a thickening agent, stabilizer or emulsifier. Modified food starches differ in their degree of cross-linking, type of chemical replacement, oxidation level, degree of molecular scission, and ratio of amylose to amylopectin.

Examples of suitable gums that can be incorporated include, but are not limited to, xanthan gum, guar gum, konjac flour and locust bean gum. Examples of suitable stabilizers include chondrus extract (carrageenan), pectin, gelatin, and agar. Their synergistic interaction improves the textural quality of foods. It imparts rich mouth feel without masking flavor, enhances moisture retention, prevents syneresis and ice crystal formation in frozen products and forms thermally reversible gels. Blends of Xanthan Gum, Locust Bean Gum and Guar Gum are commonly used in the production of extended cheese products.

Acidulants are additives that give a sharp taste to foods by increasing the tartness or acidity. They also assist in the setting of gels and to act as preservatives. An acidulant (acidic agent) can be incorporated to adjust the pH of the finished cheese to a desired level. The acidity of the cheese can be controlled to help regulate the melt down characteristics of the finished cheese. Various acids can be employed; examples of suitable acids include, but are not limited to, acetic acid, citric acid, fumaric acid, lactic acid, malic acid, phosphoric acid, tartaric acid adipic acid, hydrochloric acid, glucano delta lactone, lactobionic acid or Genlac C, the latter being a blend of water, citric acid, lactic acid, acetic acid and artificial flavors. Acid is typically added to adjust the pH of the finished cheese to a pH from about 5-6 is reached, and more typically from pH 5.10-5.90.

A colorant can be incorporated into the soft or firm/semi-hard ripened or unripened blended cheese to adjust its natural color. This can be useful, for example, if consumers have a preference for a color other than the naturally-occurring color. Examples of suitable colorants include annatto, turmeric, titanium dioxide, and beta-carotene. Colorants may be of both the natural or artificial color. If one wished to color the cheese a red, an artificial color such as FD&C red #40 can be used. Annatto imparts a yellowish color to cheese. The yellowish color often is preferred by consumers who perceive it to indicate a "richer" product upon cooking on a pizza. Colorants can be incorporated into the final soft or firm/semi-hard ripened or unripened blended cheese product by inclusion in the slurry. If added at the mixing stage, the colorant is generally sprayed onto the heated cheese mass as an unheated solution or dispersion in water. The amount of colorant added is typically in the range of about 0.01 to 0.02%, based on the weight of the finished cheese. Turmeric, if used, is generally added in an amount of about 0.01 to 0.001%. If annatto is added, it normally is added to about 0.1 to 0.2% by weight.

Various flavoring agents can also be incorporated into the cheese to tailor the flavor profile of the cheese to meet consumer preferences. Suitable flavors for mixing into the heated cheese include, for example, natural mozzarella flavor such as diacetyl and/or lipolyzed fat, or enzyme modified cheese for cheddar cheese. Flavoring agents can be incorporated into the final soft or firm/semi-hard ripened or unripened blended cheese product by incorporation into the heated slurry or by addition to the heated cheese mass as a dry powder, or more typically as part of an unheated aqueous solution. Flavoring agents are typically added in an amount such that the concentration in the final cheese product is within the range of about 0.01 to 5 wt. %. If incorporated into the slurry, the concentration of the flavoring agent in the slurry is generally is in the range of about 0.11-4.50 wt. %.

Non-dairy fat refers to various vegetable fats. These fats may be partially or fully hydrogenated, yielding a cheese product that is low in trans-fat. In an embodiment, the fat has a melting point close to that of butter fat, 93-103° F. Further, the fat may be blended with a liquid fat (oil) during the cheese making process.

Whey is the liquid remaining after milk has been curdled and strained. It is a by-product of the manufacture of cheese or casein and has several commercial uses. Sweet whey is manufactured during the making of rennet types of hard cheese like mozzarella, cheddar or Swiss cheese.

Cheese curds are an important step in the cheese making process. They are small chunks of cheese solids which have been separated from the natural whey present in milk, but not yet pressed into molds to make cheese. Different treatments of the curds yield different end cheeses, and the curds can also be eaten straight. The curdling process coagulates the solids in the milk, yielding cheese curds swimming in whey. The whey is drained from the curds, which may also be cut to facilitate drainage, and then the cheese curds can be salted, packed into molds, and turned into cheese.

Casein is the name for a family of related phosphoproteins ($\alpha S1$, $\alpha S2$, $\beta$, $\kappa$). These proteins are commonly found in mammalian milk, making up 80% of the proteins in cow milk and between 20% and 45% of the proteins in human milk. Casein has a wide variety of uses, from being a major component of cheese, to use as a food additive, to a binder for safety matches. As a food source, casein supplies amino acids; carbohydrates; and two inorganic elements, calcium and phosphorus. Casein contains a fairly high number of proline residues, which do not interact. There are also no disulfide bridges. As a result, it has relatively little tertiary structure. It is relatively hydrophobic, making it poorly soluble in water. It is found in milk as a suspension of particles called "casein micelles" which show only limited resemblance with surfactant-type micellae in a sense that the hydrophilic parts reside at the surface and they are spherical. However, in sharp contrast to surfactant micelles, the interior of a casein micelle is highly hydrated. The caseins in the micelles are held together by calcium ions and hydrophobic interactions. Types of casein commonly used in cheese making comprise, but are not limited to, rennet casein, acid casein, calcium caseinate, sodium caseinate, and potassium caseinate.

Dry blend refers to the "dry" (i.e. less than 15% water) starting material one would use in make of extended cheese product. A dry blend is a homogenous mixture of the ingredients that may be sold as a pre-packaged mix to a cheese manufacturer or user. Normally water and some type of fat would be added to produce the extended cheese product. One could also add in a desired flavor to resemble the desired cheese taste.

The dry blend that is provide here for use in the extended cheese product is designed to improve: 1) melt and flow ability of the final cheese product, which is a measure of how well the cheese melts and flows into a homogenous mass, preferably with little or no individual shreds of cheese still detectable; 2) stretch, which is measure of the ability of the cheese to form interconnected strings when the heated cheese is pulled; 3) texture, which is a measure of chewiness and smoothness; 4) coloring, which is a measure of the actual color of the melted cheese; 5) blister characteristics, which may include size, color and extent of coverage; and/or 6) nutritional composition.

The dry blends described herein are manufactured it in one step by blending all the dry material contained in the formulas described herein in a double ribbon blender. These batches are blended during addition of the ingredients, and then blended an additional 10 minutes, or until a homogenous mixture is obtained, after all ingredients have been added. Optionally, a food grade oil can be sprayed on with the blender running, with an additional 10 minutes of blending, or until a homogenous mixture is obtained. The dry product obtained at the conclusion of the blending is packed and is ready to be packaged or used in the cheese making process.

Dry Blend Examples

Examples 1-9 are for making a dry blend for use in making an extended cheese product suitable for use on pizza.

| Ingredients | Example 1 Weight % | Example 2 Weight % |
|---|---|---|
| Acetylated Potato Starch | 33.68 | 33.68 |
| Acid-treated Corn Starch | 16.04 | 16.04 |
| Corn starch | 20 | 20 |
| Dry Sweet Whey | 14.3 | 14.3 |
| Salt | 5.18 | 5.18 |
| Alkaline Sodium Aluminum Phosphate | 6.7 | 0 |
| Sodium Citrate | 0 | 6.7 |
| Sorbic Acid | 1.5 | 1.5 |
| Mineral Oil | 0.75 | 0.75 |
| Blend of Xanthan, Locust, and Guar Gums | 1.85 | 1.85 |
| TOTAL INGREDIENTS | 100 | 100 |

| | Example 3 Weight % | Example 4 Weight % | Example 5 Weight % |
|---|---|---|---|
| Acetylated Potato Starch | 27.75 | 40.125 | 24.625 |
| Hydroxypropyl Phosphate Potato Starch | 10 | 10 | 10 |
| Starch Sodium Octenyl Succinate | 6.25 | 6.25 | 6.25 |
| Casein | 18 | 0 | 18 |
| Dry Sweet Whey | 14.6 | 14.6 | 14.6 |
| Salt | 8.75 | 8.75 | 8.75 |

-continued

| Ingredients | | | |
|---|---|---|---|
| Alkaline Sodium Aluminum Phosphate | 6.25 | 9.375 | 9.375 |
| Sodium Citrate | 1.25 | 1.25 | 1.25 |
| Disodium Phosphate-Duohydrate | 1.25 | 1.25 | 1.25 |
| Sorbic Acid | 1.5 | 1.5 | 1.5 |
| Mineral Oil | 0.75 | 0.75 | 0.75 |
| Blend of Xanthan, Locust, and Guar Gums | 1.85 | 4.35 | 1.85 |
| Citric Acid | 1.8 | 1.8 | 1.8 |
| TOTAL INGREDIENTS | 100 | 100 | 100 |

| | Example 6 Weight % | Example 7 Weight % |
|---|---|---|
| Acetylated Potato Starch | 43.88 | 12.43 |
| Hydroxypropyl Phosphate Potato Starch | 11.11 | 10 |
| Starch Sodium Octenyl Succinate | 6.87 | 6.25 |
| Oxidized Acetylated Potato Starch | 0 | 30 |
| Dry Sweet Whey | 16.06 | 14.6 |
| Salt | 0 | 6.8 |
| Alkaline Sodium Aluminum Phosphate | 10.31 | 9.38 |
| Sodium Citrate | 1.37 | 1.25 |
| Disodium Phosphate - duohydrate | 1.37 | 1.25 |
| Sorbic Acid | 1.5 | 1.5 |
| Mineral Oil | 0.75 | 0.4 |
| Blend of Xanthan, Locust, and Guar Gums | 4.78 | 4.35 |
| Citric Acid | 2 | 1.8 |
| TOTAL INGREDIENTS | 100 | 100 |

| | Example 8 Weight % | Example 9 Weight % |
|---|---|---|
| Acid-treated Corn Starch | 10.05 | 10.05 |
| Pregelatinized Rice Flour | 10.5 | 10.5 |
| Dry Sweet Whey | 5 | 5 |
| Salt | 5.5 | 5.5 |
| Beef Gelatin | 4 | 4 |
| Alkaline Sodium Aluminum Phosphate | 7.5 | 0 |
| Sodium Citrate | 1.25 | 2.5 |
| Disodium Phosphate - duohydrate | 1.25 | 2.5 |
| Trisodium Phosphate | 0 | 5 |
| Oxidized Potato Starch | 38 | 38 |
| Sorbic Acid | 1.2 | 1.2 |
| Mineral Oil | 0.4 | 0.4 |
| Hydroxypropyl Distarch Phosphate | 10 | 10 |
| Blend of Xanthan, Locust, and Guar Gums | 2.35 | 2.35 |
| Citric Acid | 3 | 3 |
| TOTAL INGREDIENTS | 100 | 100 |

The dry blends disclosed herein can be made into extended cheese products via the following process. Melt the fat (milk or vegetable fat) and then add the dry blend, optionally add flavoring, and then add water, in that order, and blend for 5 minutes. Cook the mixture to 160° F.-175° F. Add cheese and/or cheese curd and cook the resulting mixture to 160° F.-175° F. Form the extended cheese product and cool it. The extended cheese product can then be packaged and refrigerated. Once cool, the product may be shredded or sliced, if desired. The amount of natural cheese product used may vary, such as from 20%-80%, depending the on the desired product.

Alternatively, melt the fat (milk or vegetable fat) and then add the dry blend, optionally add flavoring, add all water, then the casein and/or cheese and/or cheese curds in that order, and blend for 1 minute. Cook the mixture to 150° F.-155° F. Mix for 1 minute. Cook the resulting mixture to 160° F.-170° F. Form the extended cheese product and cool it. The extended cheese product can then be packaged and refrigerated. Once cool, the product may be shredded or sliced, if desired. The amount of natural cheese product used may vary, such as from 20%-80%, depending the on the desired product.

Meltability is measured by cutting a disk of cheese of a specified size, and placing the disk in a glass Petri dish. A technician heats the Petri dish in an oven at an elevated temperature for a specified time (350° F. for seven minutes), then pulls the dish out and measures the diameter of the circle the melted cheese has formed.

Stretchability of cheese can be determined by adapting a texture-profile analyzer to pull strands of cheese upwards from a reservoir of melted cheese. Cheese is placed into a stainless steel cup and tempered in a water bath at varying elevated temperatures, such as 60, 70, 80, or 90° C., for a specified time period, such as 30 min, before analysis. The cup is then placed in a water-jacketed holder mounted on the base of the instrument. A three-pronged hook-shaped probe is lowered into the melted cheese and then pulled vertically until all cheese strands break or 30 cm is reached. This produces a stretch profile as the probe is lifted through the reservoir of melted cheese and then pulls strands of cheese upwards. An additional test for measuring the stretchability of cheese was developed by heating a specified amount of cheese on a thermostatically controlled hot plate, followed by measuring the distance between the hot plate and moveable stretching plate before the cheese strands are torn off.

Further, a subjective test for meltability and stretchability may be performed. The cheese is shredded and a predetermined amount, such as about 200 g, is placed on top of a pizza crust covered in pizza sauce. The resulting pizza is baked in an over, such as for 4-9 minutes at 500° F. The pizza is removed from the oven and allowed to cool, such as for 1 minute. A visual check is then performed to determine if the cheese melted. If so, the melting is checked for homogeneity of the melt and spreading. The melted cheese is stretched and subjective determinations about the stretchability can be made, such as long stretches and weak stretchability.

The above dry blends will provide an ingredient to be used in making extended cheese products with improved melting and stretching properties.

It is understood that the examples and embodiments described herein are for illustrative purposes only and that various modifications or changes in light thereof will be suggested to persons skilled in the art and are to be included within the spirit and purview of this application and scope of the appended claims. The cheeses of the present invention may be made by the methods described herein, or by any other method that produces a finished cheese product having the same physical or chemical properties as the present cheeses. All publications, patents and patent applications cited herein are hereby incorporated by reference in their entirety for all purposes to the same extent as if each individual publication, patent or patent application were specifically and individually indicated to be so incorporated by reference.

What is claimed is:

1. A dry blend, being free of casein, having a water content of 15% or less, and comprising:
   a. 11%-13% Acetylated food Starch;
   b. 9%-11% Hydroxypropyl Phosphate food Starch;

c. 5%-7% Starch Sodium Octenyl Succinate;
d. 29%-31% Oxidized Acetylated food Starch;
e. 13%-16% Dry Sweet Whey;
f. 5%-8% Salt;
g. 8%-11% Alkaline Sodium Aluminum Phosphate;
h. 0%-2% Sodium Citrate;
i. 0%-2% Disodium Phosphate-Duohydrate;
j. 0%-2% Sorbic Acid;
k. 0%-1% Mineral Oil;
l. 1.3%-6% Blend of Xanthan, Locust, and Guar Gums; and
m. 0%-3% Citric Acid;
wherein an analogue cheese, free of casein and formed from the 8%-62% dry blend, 10%-84% water, and 8%-62% of a fat at between 45° F. and 160° F., is firm enough for shredding and slicing at 40° F., and is emulsion and color stable during processing and melting.

2. The dry blend as recited in claim 1, further comprising a further acidulant chosen from acetic acid, fumaric acid, lactic acid, malic acid, phosphoric acid, and tartaric acid.

3. The dry blend as recited in claim 2, wherein said further acidulant is chosen from lactic acid, and acetic acid.

4. The dry blend as recited in claim 1, wherein said blend further comprises a native food starch.

5. The dry blend as recited in claim 1, wherein said blend further comprises gelatin.

6. The dry blend as recited in claim 1, having less than 10% water.

7. The dry blend as recited in claim 6, having less than 5% water.

8. The dry blend as recited in claim 1, consisting essentially of:
12.4% acetylated potato starch;
10% hydroxypropyl phosphate potato starch;
6.3% starch sodium octenyl succinate;
30% oxidized acetylated potato starch;
14.6% dry sweet whey;
6.8% salt;
9.4% alkaline sodium aluminum phosphate;
1.3% sodium citrate;
1.3% disodium phosphate duohydrate;
1.5% sorbic acid;
0.4% mineral oil;
4.4% blend of xanthan, locust, and guar gums; and
1.8% citric acid;
Wherein an analogue cheese, free of casein and formed from the dry blend, water, and a fat at between 45° F. and 160° F., is firm enough for shredding and slicing at 40° F., and is emulsion and color stable during processing and melting.

* * * * *